US009032700B2

(12) United States Patent
Lohrentz et al.

(10) Patent No.: US 9,032,700 B2
(45) Date of Patent: May 19, 2015

(54) FOLDING DIVIDER ASSEMBLY FOR CORN HEADER AND METHOD OF OPERATION

(71) Applicant: AGCO Corporation, Hesston, KS (US)

(72) Inventors: Randall Lohrentz, Buhler, KS (US); Robert A. Matousek, Valley Center, KS (US)

(73) Assignee: AGCO Corporation, Duluth, GA (US)

(*) Notice: Subject to any disclaimer, the term of this patent is extended or adjusted under 35 U.S.C. 154(b) by 98 days.

(21) Appl. No.: 13/798,873

(22) Filed: Mar. 13, 2013

(65) Prior Publication Data

US 2014/0260165 A1    Sep. 18, 2014

(51) Int. Cl.
*A01D 45/02*    (2006.01)

(52) U.S. Cl.
CPC .................................. *A01D 45/021* (2013.01)

(58) Field of Classification Search
CPC ..... A01D 45/021; A01D 63/00; A01D 63/04; Y10S 56/15
USPC ............................. 56/119, 314, 60, 15.2, 15.8
See application file for complete search history.

(56) References Cited

U.S. PATENT DOCUMENTS

| | | | | |
|---|---|---|---|---|
| 1,697,474 | A * | 1/1929 | Peters | 56/314 |
| 3,349,549 | A * | 10/1967 | Van der Lely | 56/10.2 R |
| 3,460,323 | A * | 8/1969 | Schnaidt | 56/15.7 |
| 3,967,439 | A * | 7/1976 | Mott | 56/314 |
| 4,227,366 | A | 10/1980 | Pucher | |
| 4,244,162 | A | 1/1981 | Pucher | |
| 4,446,682 | A * | 5/1984 | Jennen et al. | 56/119 |
| 4,538,404 | A * | 9/1985 | Heimark et al. | 56/314 |
| 4,553,379 | A * | 11/1985 | Kalverkamp | 56/60 |
| 5,195,309 | A * | 3/1993 | Mossman | 56/119 |
| 5,787,697 | A * | 8/1998 | Post | 56/119 |
| 5,865,019 | A * | 2/1999 | Hurlburt et al. | 56/119 |
| 5,910,092 | A * | 6/1999 | Bennett | 56/119 |
| 6,116,010 | A * | 9/2000 | Salley | 56/257 |
| 6,247,297 | B1 | 6/2001 | Becker | |
| 6,513,313 | B1 | 2/2003 | Bennett | |
| 7,162,855 | B2 * | 1/2007 | Boeckmann et al. | 56/15.2 |
| 7,240,471 | B2 * | 7/2007 | Mossman | 56/119 |
| 7,350,345 | B2 * | 4/2008 | Slabbinck et al. | 56/119 |
| 7,788,890 | B2 | 9/2010 | Cressoni | |
| 7,886,510 | B2 | 2/2011 | Calmer | |
| 8,141,331 | B2 * | 3/2012 | Bich et al. | 56/15.2 |

(Continued)

OTHER PUBLICATIONS

International Searching Authority, Search Report for International Application PCT/US14/21744, mailed Jul. 7, 2014.

(Continued)

*Primary Examiner* — Árpád Fábián-Kovács

(57) ABSTRACT

A corn header has a row unit frame and an auger sweeping ears of corn toward a center of the corn header. A corn row divider assembly has a snout and gatherer hood hingeably coupled to, and aft of, the snout. An aft end of the gatherer hood is located beneath and to the rear of the fore end of the auger in an operational configuration of the divider assembly. The divider assembly further has a four-point hinge assembly coupling the aft end of the gatherer hood to the row unit frame. The four-point hinge assembly is configured to pivot the gatherer hood between the operational configuration and a non-operational configuration in which the gatherer hood is in a raised condition. The four-point hinge assembly moves the aft end of the gatherer hood forward so that the gatherer hood clears the auger when pivoting to the non-operational configuration.

9 Claims, 10 Drawing Sheets

(56) References Cited

U.S. PATENT DOCUMENTS

| | | |
|---|---|---|
| 8,220,237 B1 | 7/2012 | Calmer |
| 8,387,352 B2 * | 3/2013 | Silver et al. .................. 56/319 |
| 8,640,434 B2 * | 2/2014 | Lohrentz et al. .............. 56/119 |
| 2007/0193242 A1 * | 8/2007 | Kost et al. .................... 56/119 |
| 2009/0025354 A1 * | 1/2009 | Guldenpfennig et al. ...... 56/119 |
| 2012/0291410 A1 | 11/2012 | Silver et al. |

OTHER PUBLICATIONS

"Corn Heads ROTO Cross-Cut"; Cressoni Engineering A.M.; www.rotocrosscut.com; 2008.

* cited by examiner

FOLDING DIVIDER ASSEMBLY FOR CORN HEADER AND METHOD OF OPERATION

TECHNICAL FIELD

The present disclosure is generally related to headers for agricultural machines and, more particularly, is related to corn headers.

BACKGROUND

Agricultural harvesters such as combines are typically equipped with a harvesting header. For instance, corn headers are specifically designed to pick up corn, and vary in size (e.g., two row units, twelve row units, etc.). As the harvester moves through the field, each row unit passes between rows of corn. Corn header row units typically use gathering chains or other mechanisms to covey crop material and ears rearward toward a cross auger. A set of driven stalk rolls, which may rotate based on the speed of the harvester, grabs the corn stalks and forces them downward between stripper plates. The ears of corn are snapped free of the stalk and the cross auger passes the ears to the feeder housing of the harvester. When the harvesting job is completed, the corn header is transported based on a fore and aft length that may be limited by regulations, and stored. Each stalk roll resides beneath a corn row divider assembly that includes a snout and gatherer hood. When one or more row units require servicing, the snout and gathering hood for one or more corn row divider assemblies may be raised to enable access to the row units or stalk roll associated with the row units. In each case, the corn header and corn row divider assembly configuration (e.g., overall arrangement and dimensions) during harvesting operations (e.g., operational configuration) is typically different than a non-operational configuration (e.g., for transport and/or storage).

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
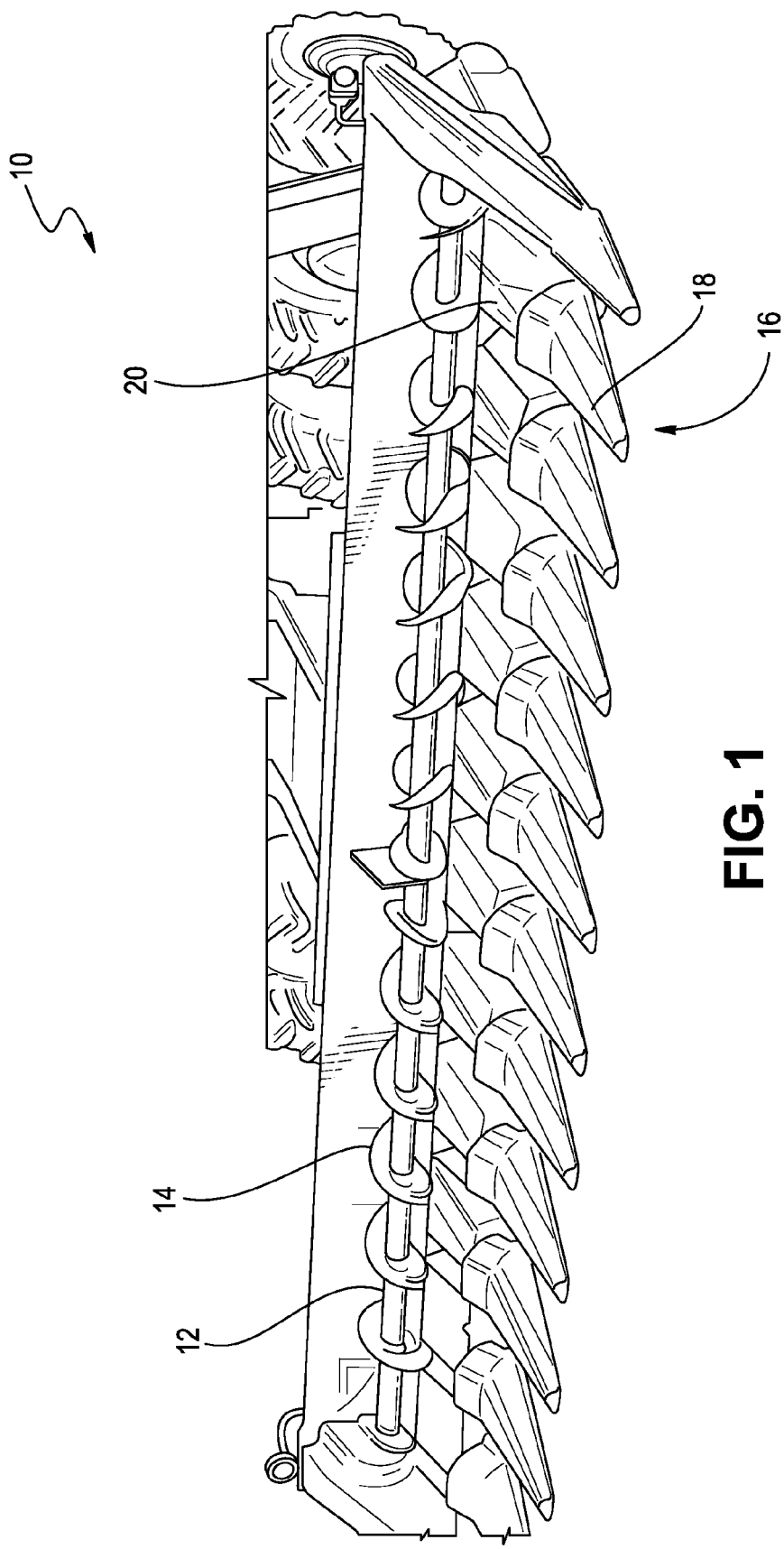
FIG. 1 is a schematic diagram showing a front perspective view of an example embodiment of a corn header in an operational configuration.

In one embodiment, a method comprising moving a corn row divider assembly of a corn header forwardly and upwardly from an operational configuration of the corn row divider assembly, the corn row divider assembly comprising a snout hingeably coupled to the gatherer hood; collapsing the snout relative to the gatherer hood; and moving the collapsed snout and gatherer hood rearward to a non-operational configuration.

Detailed Description

Certain embodiments of a corn header and associated corn row divider assembly are disclosed that enable the corn header and its component parts to transition from an operational configuration (e.g., to harvest crop material) to a non-operational configuration (e.g., transport or storage configurations). In order for a corn header to function properly, the relationships and shapes of the snout and gatherer hood of the corn row divider assembly, and cross auger are important. For instance, a corn header has recently been developed by the assignee of the present disclosure that functions well with crop interaction (e.g., in the operational configuration), yet the design presents challenges when using conventional structures (e.g., simple hinge) for folding the snout and gatherer hood enough for end-wise transport and high enough for storage on the ground in the folded position. In particular, in one design, the cross auger overhangs the rear (aft end) of the gatherer hood, which limits the angle that the snout and gatherer hood of each corn row divider assembly can be raised without interference with the cross auger when using a simple hinge. However, the overhang is the result of a large diameter cross auger that, through its extended "reach," promotes good feeding and, in general, excellent field performance. Certain embodiments of corn headers and corn row divider assemblies overcome these challenges by using a telescoping support (e.g., mechanical, gas strut, etc.) in coordination with a four-point hinge assembly that causes momentary upward and forward movement of each corn row divider assembly from the operational configuration, enabling the aft end of the gatherer hood to circumvent the fore end cross auger overhang.

Having summarized certain features of a corn header and associated corn row divider assembly of the present disclosure, reference will now be made in detail to the description of the disclosure as illustrated in the drawings. While the disclosure is described in connection with these drawings, there is no intent to limit it to the embodiment or embodiments disclosed herein. Further, although the description identifies or describes specifics of one or more embodiments, such specifics are not necessarily part of every embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is a schematic diagram showing a front perspective view of an example embodiment of a corn header 10 in an operational configuration. The corn header 10 may be coupled to the front of an agricultural harvester, such as a combine harvester, as is known to those having ordinary skill in the art. The corn header 10 comprises a cross auger 12 with spiral flighting 14 for sweeping the ears of corn toward the center of the header 10. Large cross augers 12 may also have paddles, fingers, or some other structures to facilitate the delivery of the crop rearward to a feeder housing of the combine harvester. The header 10 has a plurality of forward-extending corn row divider assemblies 16, which provide a covering for underlying plural row units. The row units and the cross auger 12 define a feeder plane therebetween where useable parts of stalk crops are conveyed rearward from the row units to the cross auger 12. One having ordinary skill in the art should appreciate in the context of the present disclosure that the number of corn row divider assemblies 16 may differ among different types of corn header, and that other configurations of corn headers with or without a different quantity of corn row divider assemblies are contemplated to be within the scope of the disclosure. Each corn row divider assembly 16 comprises a fore and aft snout 18 and gatherer hood 20, respectively, that are hingeably coupled. In one embodiment, the snout 18 is longer than the gatherer hood 20, though not limited as such. As should be appreciated by one having ordinary skill in the art, each corn row divider assembly 16 covers one stalk roll from each adjacent row unit, and further covers associated structures, such as the pairs of gathering chains (or other conveying mechanisms), etc.

Figure 2A:
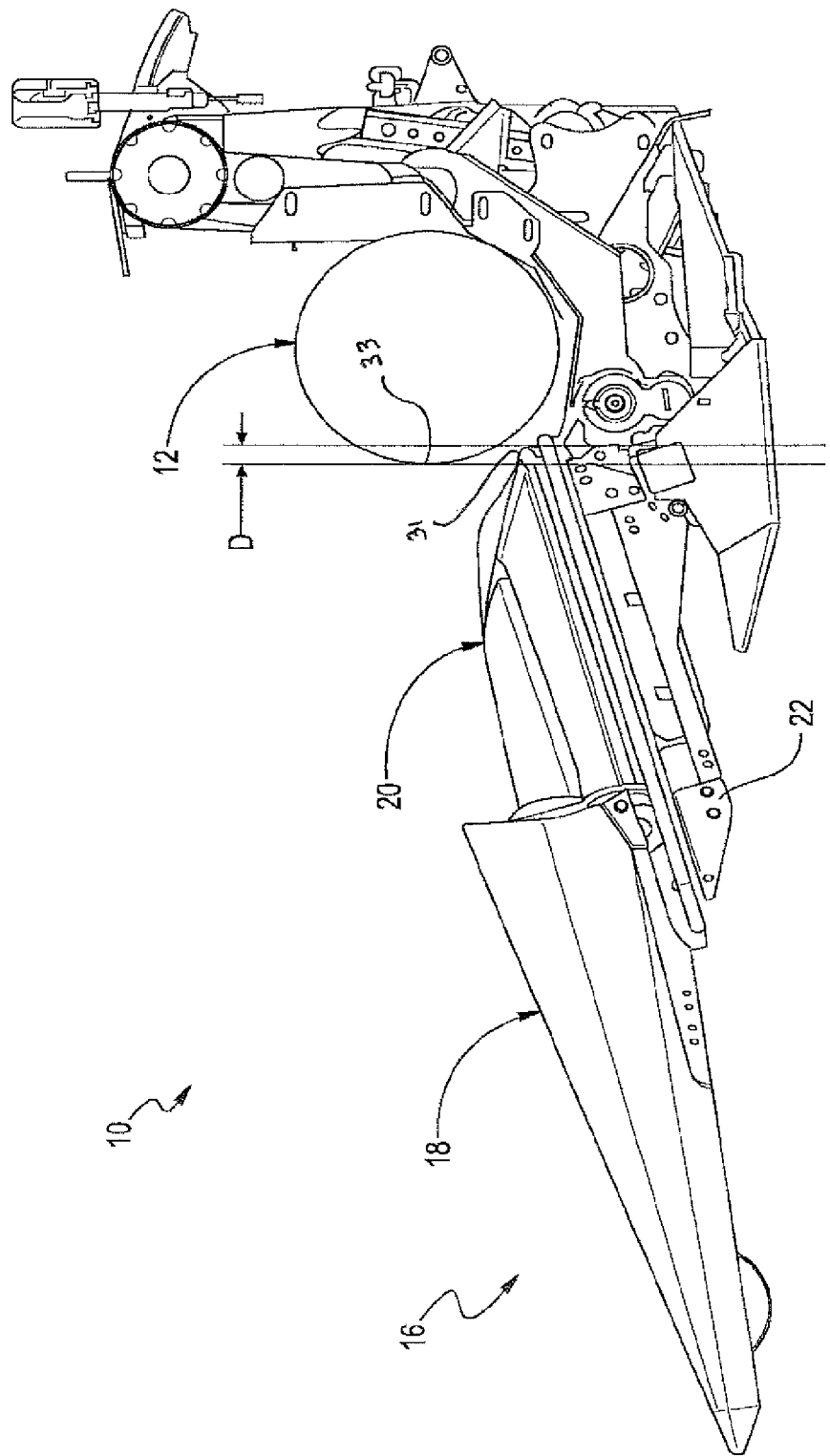
FIGS. 2A-2C are schematic diagrams showing a fragmentary, side elevation view of an example embodiment of a corn header having a corn row divider assembly comprising a snout and gatherer hood as the corn row divider assembly transitions from an operational configuration to a non-operational configuration.
Figure 2B:
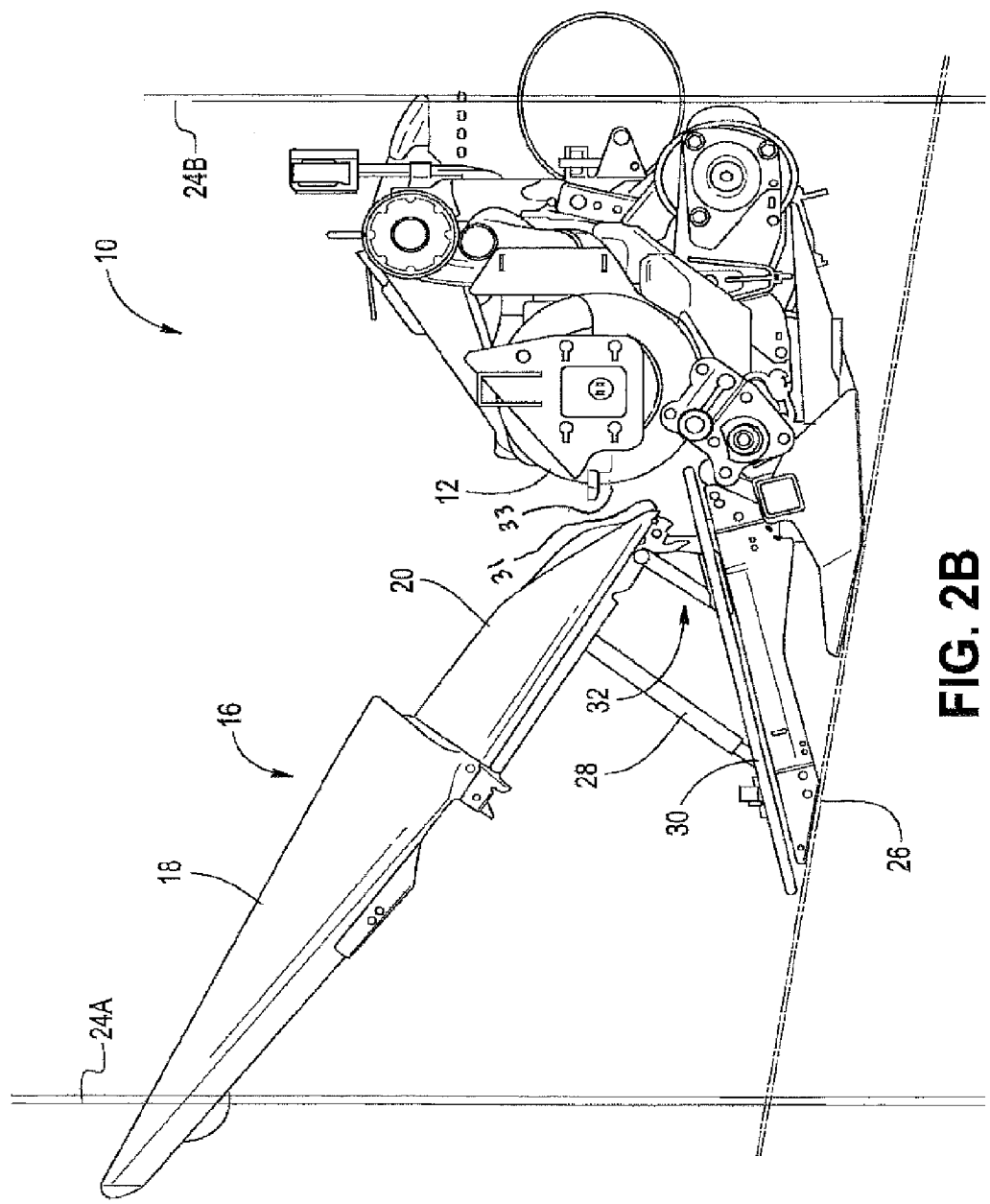
Figure 2C:
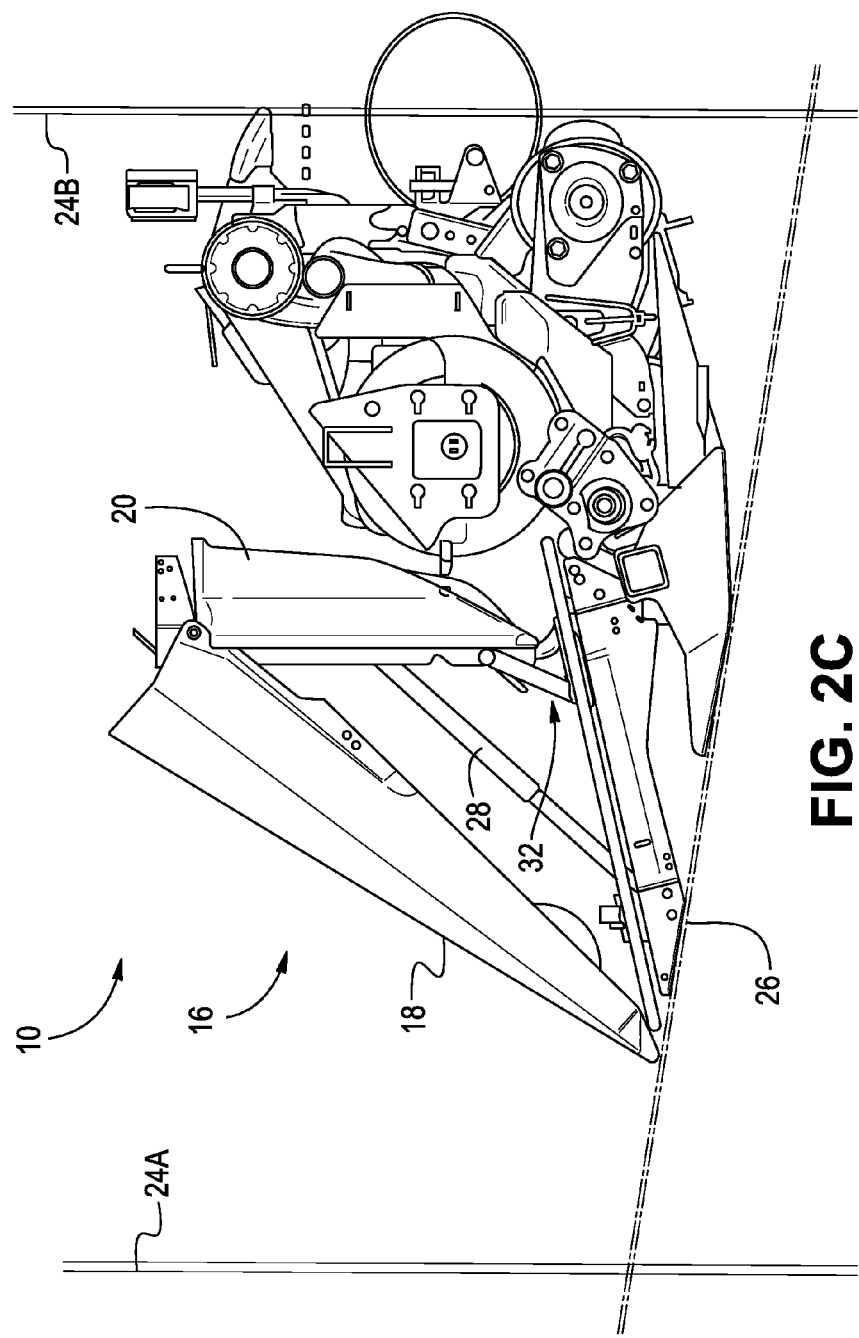

Turning attention to FIGS. 2A-2C, shown are schematic diagrams that illustrate, in fragmentary, side elevation view, the corn header 10 of FIG. 1 as each corn row divider assembly 16 16 transitions from an operational configuration to a non-operational configuration. As described above, and referring to FIG. 2A, the corn header 10 comprises plural corn row divider assemblies 16, such as corn row divider assembly 16. The corn row divider assembly 16 comprises the fore end snout 18 hingeably coupled to the aft end gatherer hood 20. The corn header 10 also comprises the cross auger 12, which is depicted in FIG. 2A as slightly overhanging a defined distance "D" relative to the aft end of the gatherer hood 20. Also depicted in FIG. 2A is a row unit 22, comprising well-known functionality. Other depicted structures, such as the frame, drive for the cross auger, etc. are well-known and hence discussion of the same is omitted here for brevity.

Referring to FIG. 2B, shown is the corn header 10, and in particular, the corn row divider assembly 16, in a transitional configuration (e.g., in one embodiment, one or more configurations between operational and non-operational configurations). Length dimension limits 24A and 24B represent the maximum length of the corn header 10 allowed in certain jurisdictions when in the transport configuration. The ground plane is denoted as reference numeral 26, and serves as a boundary beyond (e.g., beneath) which a proper design for the corn row divider assembly 16 and corresponding folding function, as disclosed herein, should not exceed. Also introduced in FIG. 2B is a telescoping support 28 (e.g., mechanical-based, gas strut, etc.) secured on one end to a row unit frame 30 and at the other end to an underside (e.g., to an upper frame) of the gatherer hood 20. A four-point hinge assembly 32 is also depicted in FIG. 2B as located at the underside, aft-end of the gatherer hood 20. As described below, the cooperation of the support 28 and four-point hinge assembly 32 enables a transitional configuration of the corn row divider assembly 16 where the snout 18 and gatherer hood 20 move upward and (at least momentarily) forward of a fore end 31 of the cross auger 12 to circumvent interference between an aft end 33 of the gathered hood 20 and the fore end 31 of the cross auger 12.

Explaining further, the snout 18 and gatherer hood 20 in FIG. 2B are shown in a transitional configuration corresponding to a service position. Compared to conventional corn headers that use a simple hinge, the corn header 10 of the present disclosure uses, at the rear and underside of the gatherer hood 20, the four-point hinge assembly 32. One advantage to using the four point hinge assembly 32 over a simple hinge is that, as the snout 18 and gatherer hood 20 are raised, the rear (aft end) of the gatherer hood 20 moves away from the cross auger 12 and upward. Such an upward and forward moving motion enables more clearance between the gatherer hood 20 and the cross auger 12, resulting in an increased angle by which the snout 18 and gatherer hood 20 assembly can be raised without interference with the cross auger 12. The position of the pivot points, the distance between pivot points, and their relationships determine the motion of the assembly.

FIG. 2C shows the corn header 10 (and corn row divider assembly 16) in a non-operational configuration (e.g., for transport and/or storage). The support 28 is extended to a steady-state (e.g., locked or secured) position, as is the four-point hinge assembly 32, and the snout 18 and gatherer hood 20 are collapsed or folded over relative to one another, enabling the corn header 10 to reside within the fore and aft limits 24A and 24B (e.g., 8 ft., 6 inches) for transport without the fore end of the snout 18 extending beyond the ground plane 26. Further, the non-operational configuration (e.g., storage configuration) enables the corn header 10 to be compactly stored.

Note that in some embodiments, the non-operational configuration may correspond to any range of configurations commencing from the point when the snout 18 and gatherer hood 20 are folded over. In some embodiments, the steady-state position (e.g., for the locking of the support 28 and four point hinge assembly 32) may be located elsewhere within the post-fold over range than depicted in FIG. 2C, and in some embodiments, the range of motion of the corn row divider assembly 16 may be adjustable (e.g., through adjustment at the four-point hinge assembly 32).

Figure 3A:
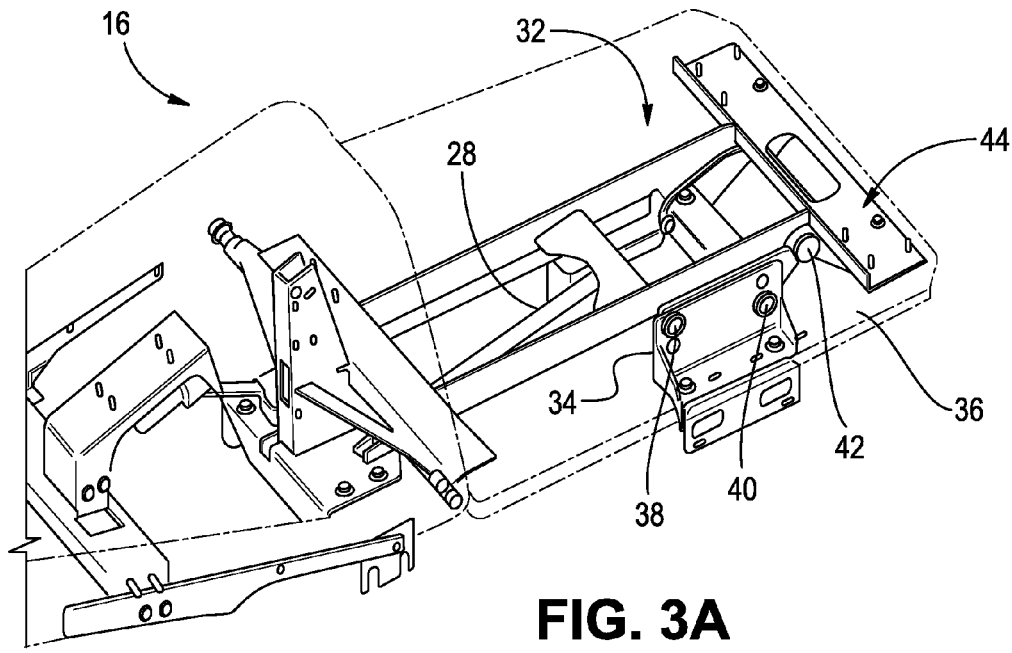
FIGS. 3A-3B are schematic diagrams showing an overhead, front perspective fragmentary view of an example embodiment of a support embodied as a gas strut, and four-point hinge assembly as the corn row divider assembly transitions from an operational configuration.
Figure 3B:
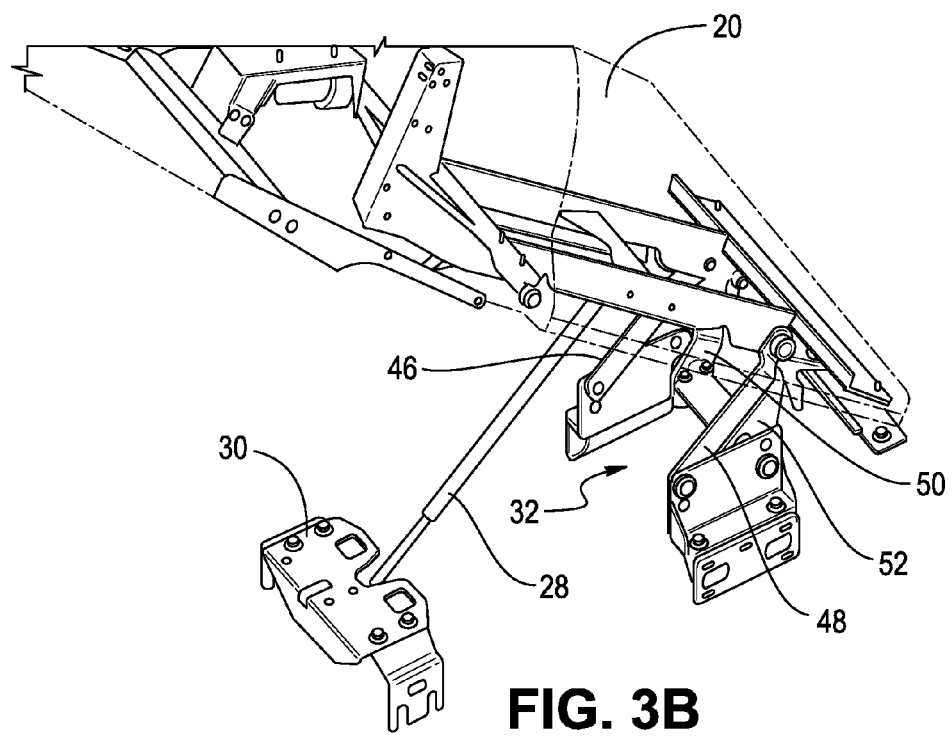

Referring now to FIGS. 3A-3B, shown are schematic diagrams in overhead, front perspective fragmentary view of an example embodiment of a support 28 embodied as a gas strut (as opposed to a mechanical, telescoping prop or support as illustrated previously) and the four-point hinge assembly 32, as the corn row divider assembly 16 transitions from an operational configuration. It should be appreciated that the support 28 may be any mechanical device(s) or assembly (or assemblies) that enables extension and retraction and secure support (steady state positioning) in the service, transport, and storage configurations (where not the same as the transport configuration). Referring to FIG. 3A, shown is bracketing 34 that couples a top frame of the gatherer hood 20 to a lower frame 36 of the corn row divider assembly. In some embodiments, the frame 36 and the frame 30 may be the same (contiguous) structure, and in some embodiments, they may be discontiguous structures. Three of the four points of the four-point hinge assembly 32 are observed in FIG. 3A, including points 38, 40, and 42. The fourth point, obscured from view, is located beneath the location denoted by reference numeral 44. Referring to FIG. 3B (with some features of FIG. 3A omitted to avoid obfuscating relevant features), the gas strut 28 is shown as extended from the frame 30 and an underside (e.g., frame) of the gatherer hood 20, and the four-point hinge assembly 32 is shown with plural hinge members 46, 48, 50, and 52 that facilitate the transition from the operational configuration shown in FIG. 3A to a transitional configuration.

Figure 4:
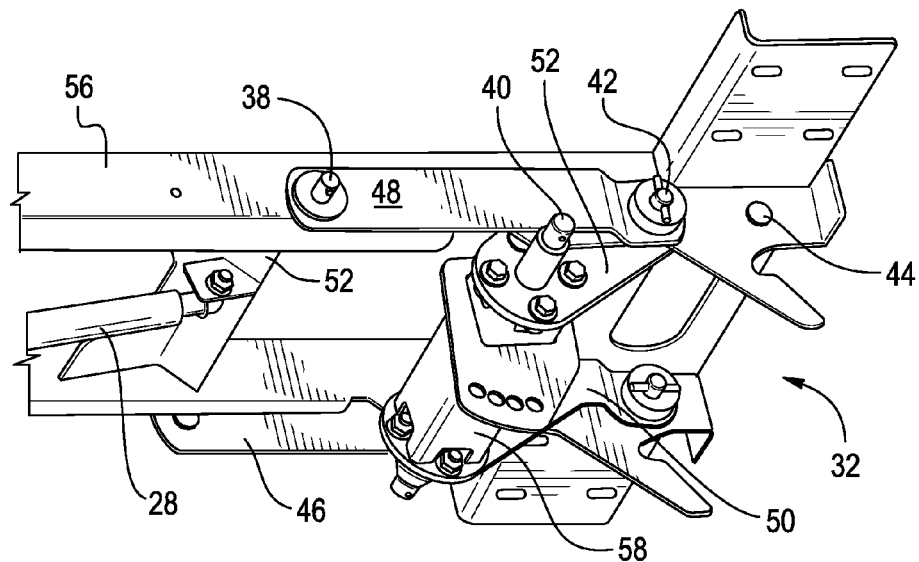
FIG. 4 is a schematic diagram showing a bottom view, side perspective of a portion of an example embodiment of an assembly comprising a telescoping support and four-point hinge assembly of an example corn row divider assembly.

Turning now attention to FIG. 4, a schematic diagram is show in a bottom, side perspective view of a portion of a telescoping support 28 coupled to a cross frame 54 of the gatherer hood 20 (FIG. 1), and a more detailed view of an embodiment of the four point hinge assembly 32. In particular, a frame 56 disposed on the underside of the gatherer hood 20 comprises the cross frame 54 extending between parallel fore and aft sides of the frame 56. Also coupled to the frame 56 are the hinge members 46, 48, 50, and 52. Referring to one of the parallel sides of the frame 56 (with the understanding of symmetry or substantial symmetry with regard to the other side), the hinge member 48 is coupled to the frame 56, fore and aft and slightly offset in elevation, at pivot points 38 and 42, respectively. The hinge member 52 comprises fore and aft and slightly offset in elevation pivot points 40 and 44, the latter coupled to the frame 56. The frame members 52 and 50 are coupled to together by an intervening rotating member 58 disposed between the two parallel sides of the frame 56. It should be appreciated that the four-point hinge assembly 32 depicted in FIG. 4 is illustrative, and that in some embodiments, other four-point hinge structures may be used and hence are contemplated to be within the scope of the disclosure.

Figure 5A:
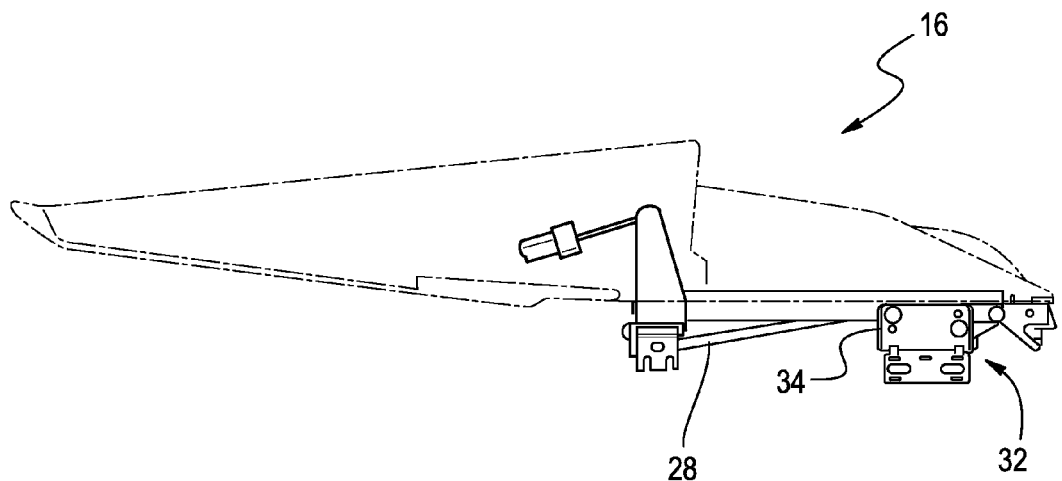
FIGS. 5A-5C are schematic diagrams showing a fragmentary, side elevation view of an example embodiment of a corn row divider assembly revealing a change in configuration of an example embodiment of a four-point hinge assembly as the corn row divider assembly transitions from an operational configuration to a non-operational configuration.
Figure 5B:
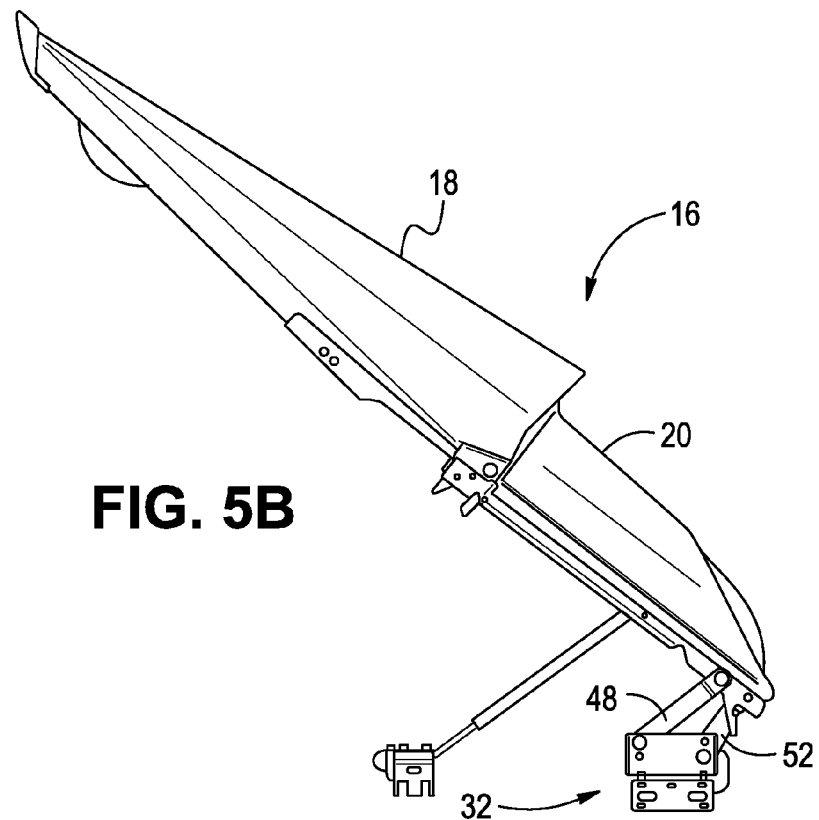
Figure 5C:
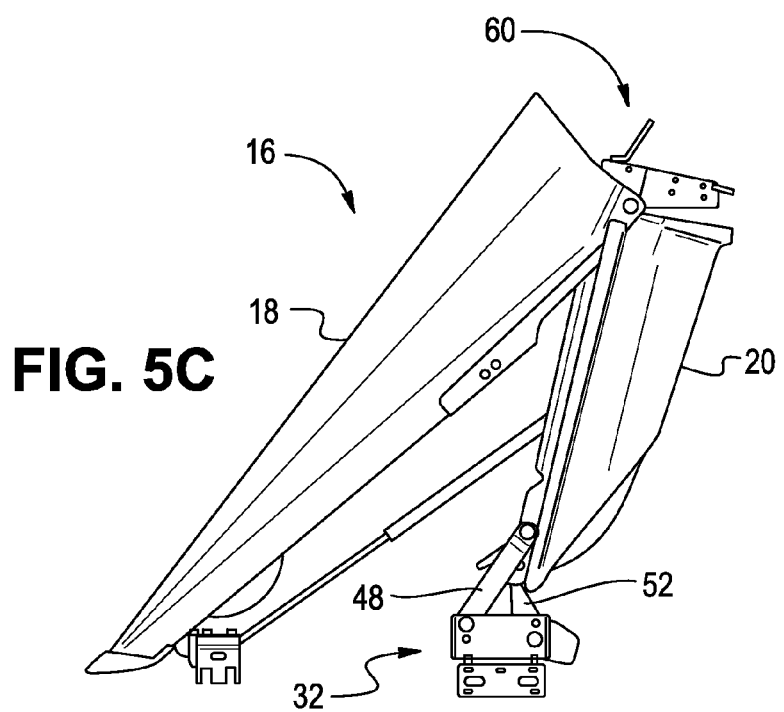

Having described an example four-point hinge assembly 32, reference is made to FIGS. 5A-5C, which are schematic diagrams showing a fragmentary, side elevation view of an example embodiment of a corn row divider assembly 16 revealing a change in configuration of the four-point hinge assembly 32 of FIG. 4 as the corn row divider assembly 16 transitions from an operational configuration to a non-operational configuration. Discussion of certain features, such as the support 28, have been omitted to focus on the progression in movement of the four-point hinge assembly 32. As shown in FIG. 5A, the four-point hinge assembly 32 is at least partially obscured from view by the bracketing 34. The corn row divider assembly 16 is depicted in the operational configuration. In FIG. 5B, and referring to the four-point hinge assembly 32 from the perspective of one side (with the other side operating in kind), the corn row divider assembly 16 is depicted in a transitional configuration (e.g., service position), with the hinge members 48 and 52 shown oriented in a somewhat counter-clockwise fashion (viewed from the perspective of the figure) relative to the operational configuration of FIG. 5A, with the four-point hinge assembly 32 raising the snout 18 and gatherer hood 20 to approximately a forty-five degree angle relative to the operational configuration (though not limited to that angle for the service position). With regard to FIG. 5C, the somewhat counter-clockwise rotation of the hinge members 48 and 52 of the four-point hinge assembly 32 of the corn row divider assembly 16 continues, wherein the snout 18 and gatherer hood 20 are in a non-operational configuration reflected by the observation that the snout 18 and gatherer hood 20 are folded relative to one another at their hingeable coupling 60 and the aft end of the gatherer hood 20, in one embodiment, is located more forwardly than when in the operational configuration (FIG. 5A). In other words, the gatherer hood 20 is tilted rearwardly, enabling the fore end of the snout 18 to be disposed closer to the aft end of the gatherer hood 20 without digging into the ground. As indicated above, some embodiments may have a non-operational configuration that is more upright than the depiction in FIG. 5C.

Figure 6A:
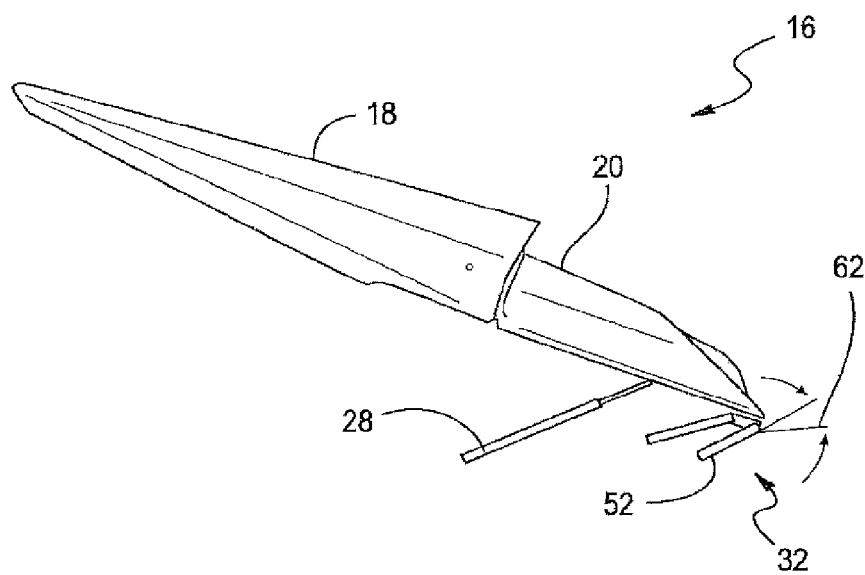
FIGS. 6A-6D are schematic diagrams showing a fragmentary, side elevation view of an example embodiment of a corn row divider assembly with telescoping support and four-point hinge assembly having a hinge member progressing through a series of relative angle changes as the corn row divider assembly transitions from an operational configuration to a non-operational configuration.

FIGS. 6A-6D are schematic diagrams showing a fragmentary, side elevation view of an example embodiment of a corn row divider assembly 16 with telescoping support 28 and four-point hinge assembly 32 having a hinge member 52 (as well as the mirrored hinge member 50, FIG. 4) progressing through a series of relative angle changes as the corn row divider assembly 16 transitions from an operational configuration to a non-operational configuration. Referring to FIG. 6A, the corn row divider assembly 16 is depicted as in a transitional configuration, where the hinge member 52 of the four-point hinge assembly 32 is shown at a fifteen (15) degree offset from a reference axis 62 (the reference axis corresponding to the zero (0) degree angle of the hinge member 52 in the operational configuration). The support 28 is shown at a given transitional extension, and the snout 18 and gatherer hood 20 are raised.

Figure 6B:
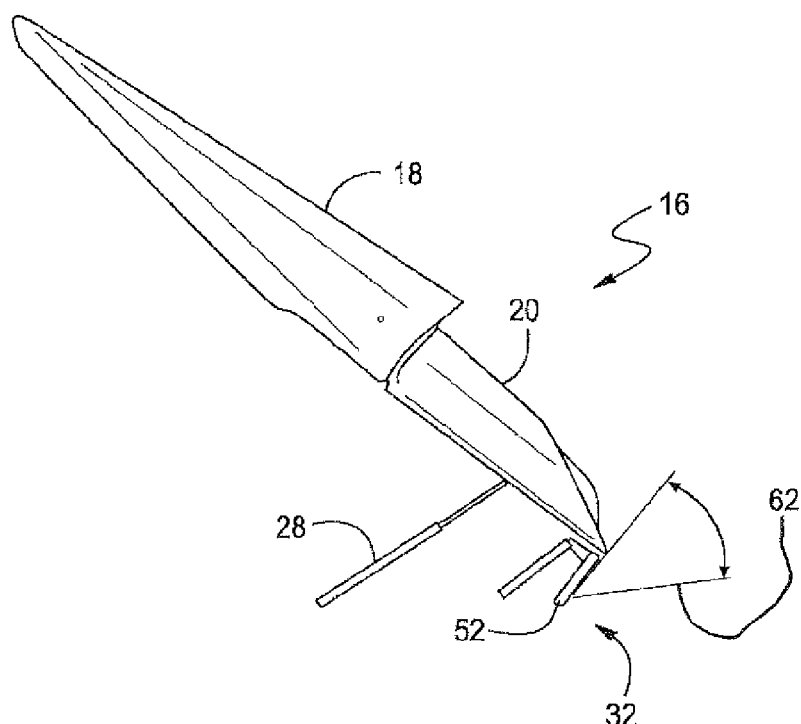

In FIG. 6B, the corn row divider assembly 16 has advanced to a transitional configuration corresponding to a service position. As shown, the support 28 has extended further relative to the configuration of the support 28 in FIG. 6A, and the hinge member 52 of the four-point hinge assembly 32 has advanced to a forty-five (45) degree angle relative to the reference axis 62.

Figure 6C:
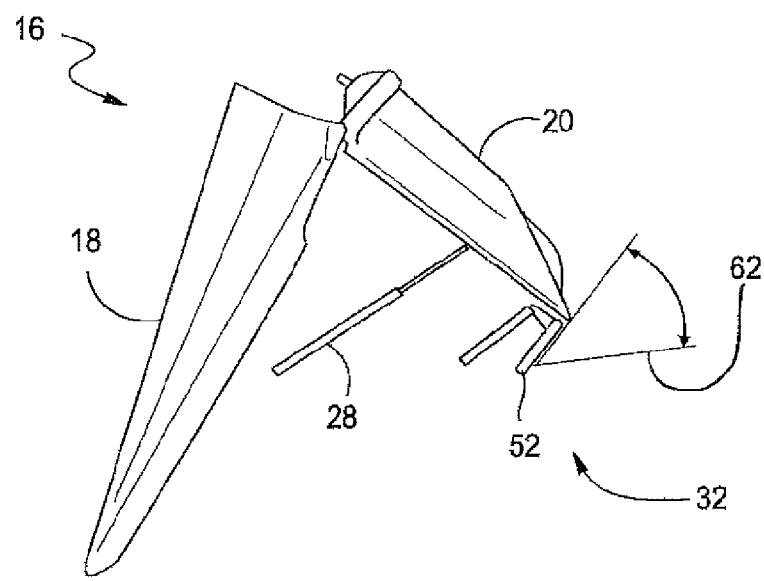

FIG. 6C reveals that the row unit 16 comprises a transitional configuration where the snout 18 and gatherer hood 20 are folded over, and the hinge member 52 of the four-point hinge assembly 32 (and the relative angle) and the support 28 remain unchanged (or insignificantly unchanged) from the configuration shown in FIG. 6B.

Figure 6D:
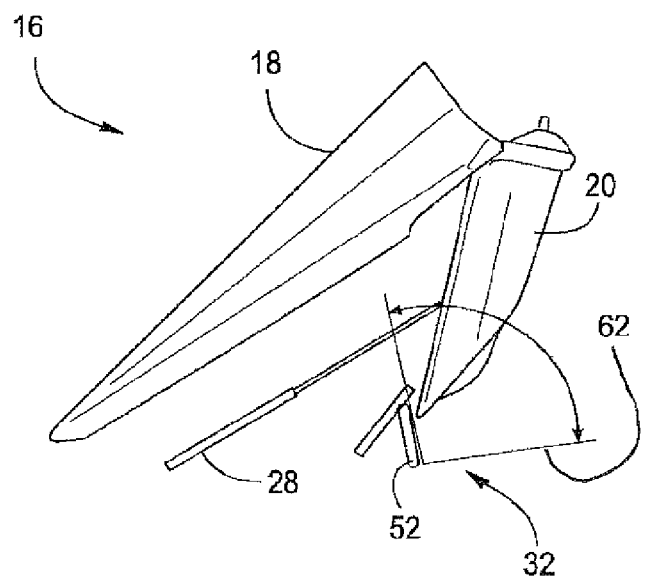

With regard to FIG. 6D, the corn row divider assembly 16 is in a non-operational configuration (e.g., storage, transport, or both), where the snout 18 and gatherer hood 20 are folded over relative to one another in a more acute angle (e.g., closer), and collectively tilted rearward. The hinge member 52 of the four-point hinge assembly 32 has advanced to a ninety (90) degree angle relative to the reference axis 62, and the support 28 is extended and locked to its secured position.

It should be appreciated by one having ordinary skill in the art in the context of the present disclosure that the transitioning from non-operational configuration to operational configuration is merely the reverse of the above-described process, and that such a method (in both directions) may be achieved through manual, automated, or semi-automated mechanisms. In some embodiments, the transitions may be achieved with or without lift assist mechanisms (e.g., springs, coils, etc.).

Figure 7:
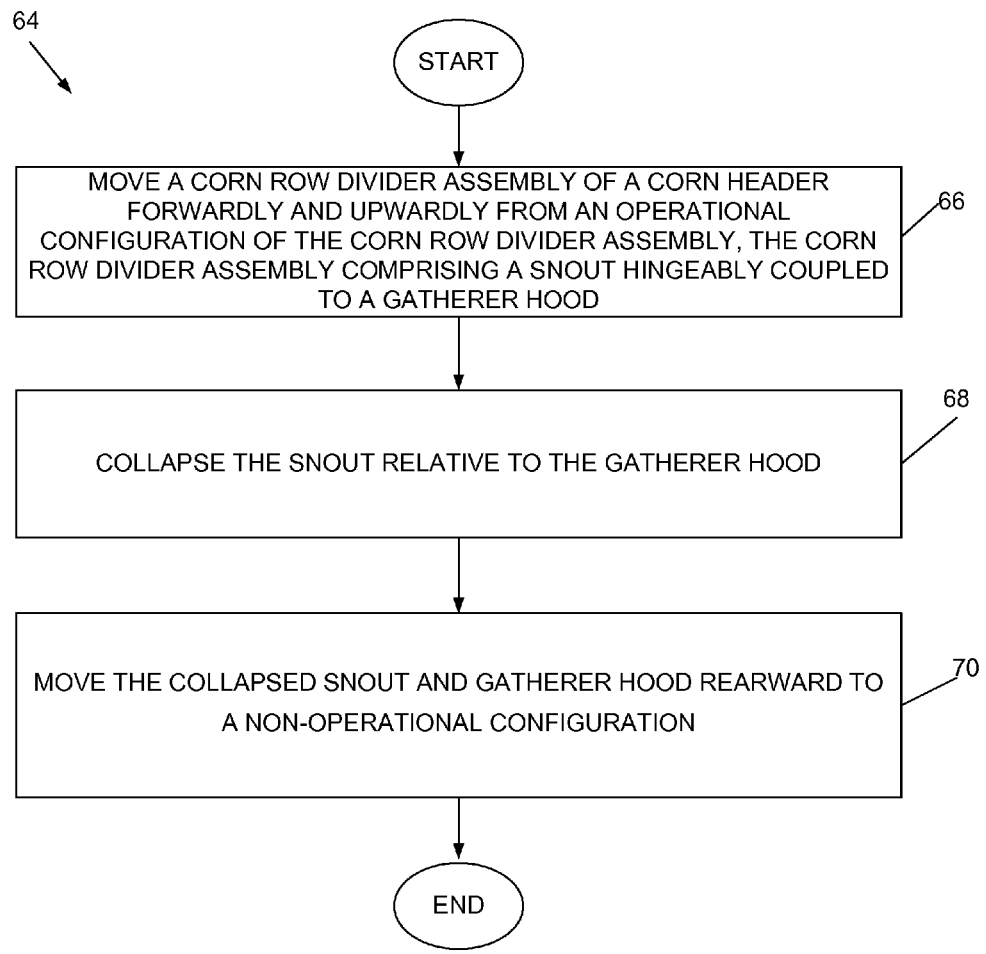
FIG. 7 is a flow diagram that illustrates an example embodiment of a gatherer and snout folding method.

Having described some example embodiments of a corn header 10 and corn row divider assembly 16, it should be appreciated in view of the present disclosure that one embodiment of a gatherer and snout folding method 64, depicted in FIG. 7, comprises moving a corn row divider assembly of a corn header forwardly and upwardly from an operational configuration of the corn row divider assembly, the corn row divider assembly comprising a snout hingeably coupled to a gatherer hood (66); collapsing the snout relative to the gatherer hood (68); and moving the collapsed snout and gatherer hood rearward to a non-operational configuration (70).

It should be appreciated by one having ordinary skill in the art that the above-described method may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modi- The invention claimed:

1. A corn header, comprising:
   a row unit frame;
   a rotatable cross auger configured to sweep ears of corn toward a center of the corn header coupled to the frame, the cross auger having a fore end defined as a forward-most portion of an outer circumference of the cross auger;
   a corn row divider assembly comprising a snout and gatherer hood hingeably coupled to, and aft of, the snout, an aft end of the gatherer hood being located beneath and to the rear of the fore end of the cross auger in an operational configuration of the corn row divider assembly, the corn row divider assembly further comprising:
      a support adjustably extending from the row unit frame to an underside of the gatherer hood; and
      a four-point hinge assembly coupling the aft end of the gatherer hood to the row unit frame, the four-point hinge assembly being configured to pivot the gatherer hood between the operational configuration and a non-operational configuration in which the gatherer hood is in a raised condition, wherein the four-point hinge assembly moves the aft end of the gatherer hood from the position in which the aft end is to the rear of the fore end of the cross auger to a position in which the aft end is forward of the fore end so that the gatherer hood clears the cross auger when pivoting to the raised non-operational configuration.

2. The corn header of claim 1, wherein the support comprises a telescoping assembly.

3. The corn header of claim 1, wherein the support comprises a gas strut.

4. The corn header of claim 1, wherein the snout is longer than the gatherer hood.

5. The corn header of claim 1, the four-point hinge assembly being configured to move the gatherer hood between the operational configuration and a transitional configuration wherein the aft end of the gatherer hood is located in front of the fore end of the cross auger, the transitional configuration comprising a transition between the operational configuration and non-operational configuration.

6. The corn header of claim 5, wherein the non-operational configuration comprises a storage configuration, a transport configuration, or both.

7. The corn header of claim 1, wherein an angle of one of plural hinge members of the four-point hinge assembly relative to a reference axis coincident with the one of the hinge members in the operational configuration ranges from approximately zero (0) degrees in the operational configuration to approximately ninety (90) degrees in a non-operational configuration.

8. The corn header of claim 1, wherein the row unit frame comprises first and second mounting brackets and the four-point hinge assembly comprises a first hinge member, a second hinge member, a third hinge member, and a fourth hinge member that enable transition from the operational configuration to the non-operational configuration, and wherein a corn row divider assembly further comprises a hood frame having two parallel sides disposed on the underside of the gatherer hood, wherein the first, second, third and fourth hinge members couple the hood frame to the mounting brackets of the row unit frame.

9. The corn header of claim 8, wherein fore ends of the first and second hinge members are coupled to first and second mounting brackets, respectively, at a first pivot point, and aft ends of the first and second hinge members are coupled to parallel sides of the hood frame, respectively, at a second pivot point, and wherein the third and fourth hinge members comprise fore and aft and slightly offset in elevation third and fourth pivot points, the third and fourth hinge members coupled to the mounting brackets at the third pivot point and coupled to the hood frame at the fourth pivot point, and wherein the third and fourth frame members are coupled together by an intervening rotating member disposed between the two parallel sides of the frame.

* * * * *